United States Patent Office 3,436,415
Patented Apr. 1, 1969

3,436,415
DIFUNCTIONAL OPTICALLY ACTIVE SILANES
Herman L. Finkbeiner and Johann F. Klebe, Schenectady, N.Y., assignors to General Electric Company, a corporation of New York
No Drawing. Filed Aug. 2, 1966, Ser. No. 569,566
Int. Cl. C07d 103/04
U.S. Cl. 260—448.2                               15 Claims The present invention relates to a method of producing heterocyclic organosilicon compounds and to the novel compositions produced thereby. More particularly, this invention relates to a novel method of producing sila-oxazolidones by the reaction of an N-aryl-substituted-α-aminoacid with a bis(N-hydrocarbonorganocarboamido)dihydrocarbonsilane.

The novel sila-oxazolidones of this invention are those of the formula

I

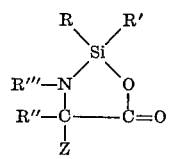

wherein R and R' are monovalent hydrocarbon radicals, halogenated monovalent hydrocarbon radicals or cyanoalkyl radicals, R" and Z are hydrogen or a monovalent hydrocarbon radical, and R''' is a monovalent aryl group, the radicals which R, R', R", R''', and Z represent being free of active hydrogen as determined by the Zerewitinoff method. In the above Formula I, R and R' and R" and Z may represent the same or different monovalent radicals.

The monovalent hydrocarbon radicals which R and R' represent are alkyl radicals including cycloalkyl radicals, e.g., methyl, ethyl, propyl, isopropyl, butyl, hexyl, dodecyl, cyclohexyl, etc.; aryl radicals, e.g., phenyl, naphthyl, biphenyl, anthracenyl, etc.; aralkyl radicals, e.g., benzyl, phenylethyl, etc.; alkaryl radicals, e.g., tolyl, xylyl, ethylphenyl, trimethylphenyl, etc.; alkenyl radicals, e.g., vinyl, allyl, methallyl, hexenyl, cyclohexenyl, etc. The cyanoalkyl radicals which R and R' represent are e.g., cyanomethyl, cyanoethyl, cyanopropyl, etc. The halogenated monovalent hydrocarbon radicals which R and R' represent are e.g., chlorophenyl, bromophenyl, trifluoropropyl, trifluoromethylphenyl, bromonaphthyl, chloropropyl, etc. The monovalent hydrocarbon radicals represented by R" and Z are those set forth above for R and R'. The monovalent aryl groups represented by R''' are e.g., tolyl, xylyl, ethylphenyl, trimethylphenyl, phenyl, naphthyl, biphenyl, anthracenyl, ethoxyphenyl, phenoxyphenyl, methoxynaphthyl, methoxyphenyl, nitrophenyl, chlorophenyl, etc.

The sila-oxazolidones of this invention are produced by forming an admixture of (1) an N-aryl-substituted-α-aminoacid of the formula

II

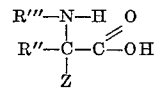

wherein R" and Z and R''' are as above-defined with (2) a bis(N-substituted-amido)dihydrocarbonsilane of the formula

III

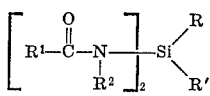

wherein R and R' are as above-defined, R¹ and R² are alkyl or aryl groups and maintaining the admixture at a temperature at which said aminoacid and said amidosilane react to produce the sila-oxazolidones of this invention. Illustrative of the alkyl groups and aryl groups represented by R¹ and R² are those set forth for R and R' above.

The temperature at which the process of this invention is carried out can vary widely and can range from about 0° C. to 150° C. or even higher. It is preferred to conduct the process of this invention at a temperature from about 15° C. to about 100° C.

The process of this invention can be conducted at sub-atmospheric, atmospheric, or super-atmospheric pressures. For ease of operation of the process, it is preferred to conduct the reaction at atmospheric pressure.

The ratio of the reactants employed in the process of this invention is not narrowly critical and can vary over wide ranges. For example, one can employ from .01 to 100 moles of the silane of Formula III for each mole of the aminoacid of Formula II. It is preferred, however, to employ approximately equal molar amounts of the reactants for ease of recovery of the reaction products. Thus, for example, one preferably employs from 0.95 to 1.05 mole of the silane of Formula III for each mole of the aminoacid of Formula II.

The process of the present invention can be conducted either in the presence or absence of a solvent. It is preferred, however, to employ a solvent for ease of operation of the process. The solvents which are useful are those materials which do not react with the starting amidosilane, the product sila-oxazolidone or the aminoacid. These solvents can be any solvents which are free of active hydrogens. Such solvents are, for example, benzene, toluene, xylene, diphenyl ether, Decalin, N-methylpyrrolidone, chlorobenzene, propionitrile, chloroform, carbon tetrachloride, and the like.

Illustrative of the starting silanes of Formula III employed in the process of this invention are bis(N-methylacetamido)phenylmethylsilane, bis(N-ethylacetamido)naphthylmethylsilane, bis(N-ethylacetamido)biphenylethylsilane, bis(N-butylpropionamido)cyclohexenylmethylsilane, bis(N-isopropylbutylamido)allylethylsilane, etc.

The process of the instant invention also has the added advantage in that if an optically active N-aryl-substituted-α-aminoacid is employed in the synthesis, optically active difunctional organosilanes (sila-oxazolidones) are produced. Insofar as it has been able to be determined, this is the first synthesis of such optically active difunctional organosilicon compositions. The diastereoisomers can then be separated to yield the dextro and levo forms of the diastereomers by fractional crystallization or other methods known to those skilled in the art.

The process of this invention is particularly advantageous when a N-phenyl-substituted-α-aminoacid of the formula

IV

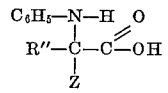

wherein R" and Z have the above-defined meanings, is employed as a starting material. When the aforementioned aminoacid of Formula IV is reacted with a bis(N-methyl)carboxamidodihydrocarbonsilane of the formula

V

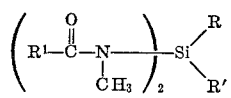

wherein R and R' are as above-defined and are different monovalent hydrocarbon, halohydrocarbon or cyanoalkyl radicals, and R¹ is as above-defined, the sila-oxazolidone produced, which usually, as those skilled in the art realize, is present in the form of two diastereomers, rearranges spontaneously to yield one diastereoisomer which contains an asymmetric silicon atom. This process is particularly useful when an optically active α-aminoacid of Formula IV is employed in-as-much as spontaneous conversion of one diastereomer into the other renders the silicon atom optically active and at the same time eliminates the need for laborious resolution techniques.

The starting bis-carboxamidodihydrocarbonsilanes of Formula III employed in the process of this invention are produced by mixing equivalent amounts of an N-substituted carboamide of the formula VI
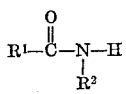

wherein $R^1$ and $R^2$ are as above-defined, such as N-methylacetamide with a dihydrocarbondihalosilane such as phenylmethyldichlorosilane in the presence of triethylamine, as shown by the following equation:

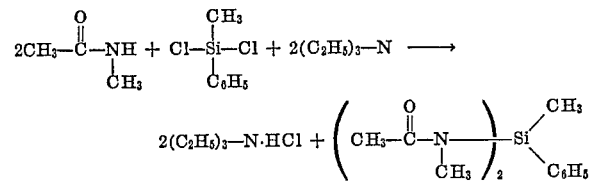

The triethylamine scavenges the hydrogen chloride produced by the reaction of the N-substituted carboamide with the chlorosilane thereby allowing the reaction to go to completion. The reaction temperature is maintained in the range of from about 15° C. to about 200° C. The bis-N-hydrocarbonamidodihydrocarbonsilanes of Formula III are recovered by distillation.

It is also possible to prepare the sila-oxazolidones of this invention by reacting the α-aminoacids with a dichlorodihydrocarbonsiloxane in the presence of a tertiary amine as hydrogen halide acceptor.

The process is most readily conducted according to the following procedure. The α-aminoacid is dissolved in the hydrogen halides acceptor, that is, the tertiary amine, and the mixture maintained at room temperature. The dihydrocarbondihalosilane is then added to the mixture with stirring. There is a slight rise in the temperature of this solution due to the exothermic heat of reaction. The solution is then filtered to remove the amine hydrochloride and the sila-oxazolidone recovered by extraction or by distillation techniques.

The ratio of reactants employed in the alternative process is not narrowly critical and one can employ from .1 to 1 mole of the aminoacid per mole of the dihydrocarbondichlorosilane. However, for simplicity of operation and ease of recovery of the reaction products, it is preferred to employ equal molar quantities of the α-aminoacid and the dihydrocarbondichlorosilane.

In conducting the process of this invention, it is preferred to employ at least 1 mole of the tertiary amine for each chlorine present in the dihydrocarbondihalosilane. It is particularly preferred to employ at least 1.5 moles of the tertiary amine for each equivalent of halogen in the dihydrocarbondihalosilane. Greater amounts of the tertiary amine can be employed, but no commensurate advantages are obtained thereby.

Solvent is not necessary in the preparation in the process of this invention. However, a solvent can be employed if desired. Solvents which can be employed are solvents in which the dihydrocarbondihalosilane and aminoacid are soluble. In most instances, excess tertiary amine would be preferably employed as the solvent. Other solvents such as benzene, toluene, xylene and the like can also be employed.

The dihydrocarbondihalosilanes which can be employed in the alternative process of this invention are those having the formula

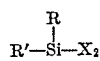

wherein R and R' have the above-defined meaning and X is halogen, that is fluorine, chlorine, bromine or iodine. Such dihydrocarbondihalosilanes are, for example, dimethyldichlorosilane, methylphenyldibromosilane, methylphenyldichlorosilane, ethylmethyldichlorosilane, methylbutyldichlorosilane, phenylnaphthyldibromosilane, cyanoethylmethyldichlorosilane, cyanopropylethyldichlorosilane, cyanobutylhexyldichlorosilane, methylcyclohexyldichlorosilane, vinylmethyldichlorosilane, allylethyldibromosilane, etc.

In accordance with this alternative process, one can get optically active sila-oxazolidones very readily when one employs an optically active N-phenyl-substituted α-aminoacid in the reaction process. As in the reaction of the amidosilane with the aminoacid, the N-phenyl-substituted optically active aminoacid derivative of the dihydrocarbondichlorosilane is unstable and rearranges to yield one optically active diastereo isomer of the sila-oxazolidone compound.

The tertiary amines which can be used as hydrogen halide acceptors in the process of this invention include aliphatic tertiary amines, tertiary polyamines and cyclic tertiary amines. The aliphatic tertiary amines, including cycloaliphatic tertiary amines, are, for example, trimethylamine, triethylamine, tripropylamine, tributylamine dimethylpropylamine, dimethylphenylethylamine, benzylmethylethylamine and bromobenzylamine, 1-dimethylamino-2-phenylpropane, 1-dimethylamino-4-pentene, etc.; tertiary polyamines are N,N,N',N'-tetraalkylpropanediamines, N,N,N',N'-tetraalkylethylenediamines and N,N,N',N'-tetraalkylbutanediamines, etc. The following amines may be mixed, tertiary aliphatic, tertiary aromatic amines, for example, piperidinoalkylpyridines, dialkylaminoalkylpyridines, morpholinoalkylenepyridines, and so forth. The tertiary polyamines are, for example, N,N,N',N'-tetramethylethylenediamine, N-ethyl-N,N',N'-trimethylethylenediamine, N,N,N',N'-tetraethylethylenediamine, N,N,N',N'-tetra-n-amylethylenediamine, 1,2-bis(2,6-dimethylpiperidino)ethane, N',N',N'',N''-tetraethyldiethylenetriamine, 2-(β-dimethylaminoethyl)-6-methylpyridine, etc. Examples of the cyclic amines are the pyridines, α-, β- and γ-collidine, α-, β- and γ-picoline, 2,4-lutidine, dipyridyls, N-alkyl pyrroles, N-alkyl pyrrolidines, N-alkyl piperidines, the N-alkyl triazoles, etc.

The primary utility of the optically active sila-oxazolidones lies in their use as intermediates in the preparation of many other types of optically active silanes and siloxanes. The sila-oxazolidones of the present invention can be hydrolyzed alone or cohydrolyzed with conventional chloro or alkoxyorganosilanes in the conventional manner to produce the whole range of resins, fluids or rubbery siloxanes, all of which are well known for their commercial utility. For example, 2-(methylphenylsila)-3-phenyloxazolidone-5 can be cohydrolyzed with dimethyldichlorsilane by water according to standard techniques to yield dimethylsiloxanephenylmethylsiloxane copolymeric siloxane gums which can be cured to elastomers.

The following examples serve to further illustrate this invention. All parts in the examples are parts by weight unless otherwise expressly set forth.

EXAMPLE 1

Dextrorotatory N-phenylalanine (8.5 grams) $[\alpha]_D^{25} = +65°$ was mixed with bis(N-methylacetamido)-methylphenylsilane (14.2 grams) in about 50 cc. of dry benzene. A clear light yellow solution was formed within a few minutes. A nuclear magnetic resonance spectrum was recorded after about 20 minutes at room temperature which indicated complete formation of two cyclic diastereomers.

The benzene and N-methylacetamide were removed in vacuum by heating at about 50° C. at 0.5 mm. of mercury for 1 hour. A material (13 grams, 89% of theory) crystallized during this process and after recrystallization from CCl₄ had a melting point of 125–128° C. Nuclear magnetic resonance spectroscopy showed the recrystallized material to be mainly one isomer. The original product had rearranged during the crystallization. The crystallized material was identified as 2-(methylphenylsila)-3-phenyl-4-methyloxazolidone-5, having the formula

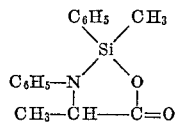

and had a specific rotation of $[\alpha]_D^{25}=27.5°$. Analysis of the crystalline material gave the following results:

Calculated: C, 67.8%; H, 6.1%; N, 5.0%. Found: C, 68.2%; H, 6.1%; N, 5.0%.

EXAMPLE 2

N-phenylglycine (15.1 grams) was mixed with bis-(N-methylacetamido)phenylmethylsilane (27.6 grams) in dry carbon tetrachloride and stirred at 35° C. for 1 hour. During this time the glycine and the silane reacted as evidenced by a nuclear magnetic resonance spectrum recorded after this period of time. The carbon tetrachloride and N-methylacetamide were removed in vacuum (about 0.5 mm. Hg) by heating at 80° C. for 1 hour. The residue crystallized. After recrystallization from a 4:1 mixture of benzene and hexane, the residue had a melting point of 84° to 86° C. and was identified as 2-(methylphenylsila)-3-phenyloxazolidone-5 having the formula

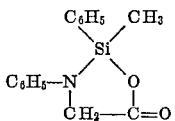

Calculated: C, 66.9%; H, 5.6%; N, 5.2%. Found: C, 66.7%; H, 5.7%; N, 5.2%.

EXAMPLE 3

β-phenyl-N-phenylalanine (1.20 grams) was mixed with bis(N-methylacetamido)phenylmethylsilane (1.38 grams) in dry benzene (5 grams) and stirrde at 35° C. for 1 hour. The benzene and N-methylacetamide were removed in vacuum (about 0.5 mm. mercury) by heating at 80° C. for about 1 hour. The residue was then distilled to yield a nearly colorless viscous fluid (B.P. 185°–195° C. at 0.1 mm. Hg). This viscous fluid on triturating with a mixture of hexane and benzene yielded a crystalline material having a melting point of from 119°–122° C. which was identified as being two diastereomers of 2-(methylphenylsila)-3-phenyl-4-benzyloxazolidone-5, having the formula

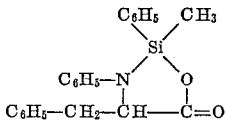

The mixture upon recrystallization from carbon tetrachloride yielded one pure diastereomer having a M.P. of 128°–130° C.

EXAMPLE 4

N-phenylvaline (5.8 grams) was mixed with bis(N-methylacetamido)phenylmethylsilane (8.3 grams) in dry benzene (11 grams) and stirred at 30° C. for 1 hour. The benzene and N-methylacetamide were removed in vacuum by heating at 80° C. at about 0.5 mm. mercury for about 1 hour. The residue was distilled to yield a crystalline material having a melting point of 109°–112° C. which was identified as being one of the two possible diastereomers of 2-(methylphenylsila) - 3-phenyl - 4-iso- propyloxazolidone-5 having the formula

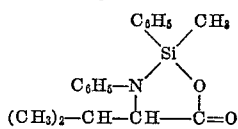

Calculated: C, 69.4%; H, 6.8%; N, 4.5%. Found: C, 69.0%; H, 7.0%; N, 4.3%.

In the same way, optically active 2-(methylphenylsila)-3-phenyl - 4-isopropyloxazolidone-5 was prepared from optically active (+) N-phenylvaline ($[\alpha]_D^{25}=+80°$). The product melted at 120°–125° C. and had a specific rotation of $[\alpha]_D^{25}=-38°$. The corresponding sila-oxazolidone from (−) N-phenylvaline ($[\alpha]_D^{25}=-80°$) had a specific rotation of $[\alpha]_D^{25}=+32.6°$.

EXAMPLE 5

N-p-tolylalanine (1.79 grams) was mixed with bis-(N-methylacetamido)phenylmethylsilane (2.76 grams) in dry carbon tetrachloride (10 grams) and stirred at 35° C. for 0.5 hour. Benzene and N-methylacetamide were removed in vacuum by heating at 80° C. at about 5 mm. mercury for about 1 hour. The residue was identified by nuclear magnetic resonance as a mixture of the two diastereomers of 2-(methylphenylsila)-3-(methylphenyl)-4-methyloxazolidone-5, having the formula

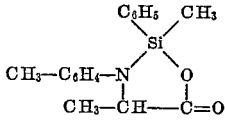

as evidenced by the nuclear magnetic resonance spectrum showing CH₃—Si singlets at 0.80 and 0.98τ and CH₃—CH doublets at 1.62 and 1.65τ when measured in a 10% solution in carbon tetrachloride).

EXAMPLE 6

N-(p-methoxyphenyl)alanine (1.95 grams) was mixed with bis(N-methylacetamido)phenylmethylsilane (2.76 grams) in dry benzene (5 grams), and stirred at 35° C. for 1 hour. Benzene and N-methylacetamide were removed by distillation in vacuum by heating at 80° C. for about 1 hour in about 0.5 mm. of mercury. The residue was identified as being a mixture of the two diastereomers of 2-(methylphenylsila) - 3-(methoxyphenyl) - 4-methyloxazolidone-5, having the formula

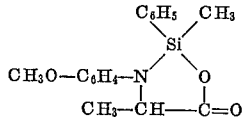

as evidenced by the nuclear magnetic resonance spectrum showing CH₃—Si singlets at 0.43 and 0.65τ, CH₃—CH doublets at 1.00 and 1.02τ and CH₃O singlets at 3.26 and 3.34τ when measured as a 10% solution in benzene.

EXAMPLE 7

N-(p-chlorophenyl)alanine (1.97 grams) was mixed with bis(N-methylacetamido)phenylmethylsilane (2.76 grams) in dry carbon tetrachloride (10 grams) and allowed to stand for 0.5 hour at a temperature of about 25° C. Carbon tetrachloride and N-methylacetamide were then removed in vacuum by heating at 80° C. at about 0.5 mm. of mercury for about 1 hour. The residue contained about equal amounts of the two diastereomers of 2 - (methylphenylsila) - 3 - p - chlorophenyl - 4 - methyloxazolidone-5, having the formula

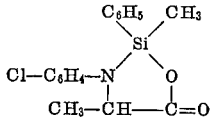

as evidenced by the nuclear magnetic resonance spectrum showing CH$_3$—Si singlets at 0.75 and 0.93τ and CH$_3$—CH doublets at 1.62 and 1.65τ when measured as a 10% solution in carbon tetrachloride.

EXAMPLE 8

Levo-N-(p-nitrophenyl)alanine prepared from p-nitrofluorobenzene and levo-alanine (0.21 gram) was mixed with bis(N-methylacetamido)phenylmethylsilane (0.276 gram) in dry carbon tetrachloride (1.5 grams) and allowed to stand at 40° C. for 2 hours. Benzene and N-methylacetamide were removed in vacuum by heating at 80° C. for about 1 hour at about 0.5 mm. of mercury. The residue was distilled to yield a glassy solid containing both diastereomers of 2-(methylphenylsila)-3-p-nitrophenyl-4-methyloxazolidone-5, having the formula

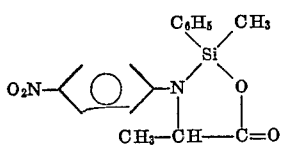

The specific rotation of this material was $[\alpha]_D^{25} = -42°$.

EXAMPLE 9

N-(m-nitrophenyl)alanine (1.23 grams) was mixed with bis(N-methylacetamido)phenylmethylsilane (1.62 grams) in dry carbon tetrachloride (6 grams) and stirred at about 30° C. for 4 hours. Carbon tetrachloride and N-methylacetamide were removed in vacuum by heating at 80° C. for about 1 hour at about 0.5 mm. of mercury. The residue was identified as being a 2:3 mixture of the two diastereomers of 2-(methylphenylsila)-3-m-nitrophenyl-4-methyloxazolidone-5, having the formula

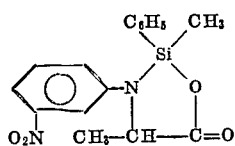

as evidenced by the nuclear magnetic resonance spectrum showing CH$_3$—Si singlets at 0.78 and 0.97τ and CH$_3$—CH doublets at 1.52 and 1.55τ when measured as a 10% solution in carbon tetrachloride.

The oxazolidones of this invention, e.g., methylphenylsila-oxazolidones can be cohydrolyzed with dimethyldichlorosilane, e.g., on a 50–50 molar basis, to yield a methylphenylsiloxane-dimethylsiloxane copolymeric gum. The copolymeric gum can be compounded with a filler, e.g., finely divided silica and dibenzoyl peroxide on a rubber mill to yield a composition which can be molded and heat-cured to yield elastomeric gaskets, hoses, etc.

EXAMPLE 10

To a mixture of 3.3 grams of N-phenylalanine and 10 grams of triethylamino was added with stirring under anhydrous conditions 3.8 grams of methylphenyldichlorosilane. Triethylaminehydrochloride precipitated and the temperature rose due to the exothermic reaction. Benzene (20 cc.) was then added and the mixture stirred for an additional hour at room temperature. The reaction mixture was then filtered to remove the triethylaminehydrochloride and the precipitate washed with hexane. The filtrate was then concentrated to yield an oily reaction product whose nuclear magnetic resonance spectrum was identical with that of 2-(methylphenylsila)-3-phenyl-4-methyloxazolidone-5 prepared as in Example 1.

The oily liquid was triturated with hexane to yield a crystalline material M.P. 106°–109° C.

What we claim as new and desire to secure by Letters Patent of the United States is:

1. A sila-oxazolidone of the formula

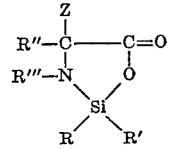

wherein R and R' are monovalent hydrocarbon radicals, halogenated monovalent hydrocarbon radicals and cyanoalkyl radicals, R'' and Z are hydrogen or monovalent hydrocarbon radicals, and R''' is a monovalent aryl group or substituted aryl group, R, R', R'', R''' and Z being free of active hydrogens as determined by the Zerewitinoff method.

2. A sila-oxazolidone of claim 1 having the name 2-(methylphenylsila)-3-phenyl-4-methyloxazolidone-5.
3. A sila-oxazolidone of claim 1 having the name 2-(methylphenylsila)-3-phenyloxazolidone-5.
4. A sila-oxazolidone of cdaim 1 having the name 2-(methylphenylsila)-3-phenyl-4-benzyloxazolidone-5.
5. A sila-oxazolidone of claim 1 having the name 2-(methylphenylsila)-3-phenyl-4-isopropyloxazolidone-5.
6. A sila-oxazolidone of claim 1 having the name 2-(methylphenylsila)-3-(4 - methylphenyl)-4-methyloxazolidone-5.
7. A sila-oxazolidone of claim 1 having the name 2-(methylphensylsila)-3-(4 - methoxyphenyl)-4-methyloxazolidone-5.
8. A sila-oxazolidone of claim 1 having the name 2-(methylphenylsila)-3-(4 - chlorophenyl)-4-methyloxazolidone-5.
9. A sila-oxazolidone of claim 1 having the name 2-(methylphenyl)-3-(4-nitrophenyl)-4-methyloxazolidone-5.
10. A sila-oxazolidone of claim 1 having the name 2-(methylphenyl)-3-(3-nitrophenyl)-4-methyloxazolidone-5.
11. A method of producing an organosilane of the formula

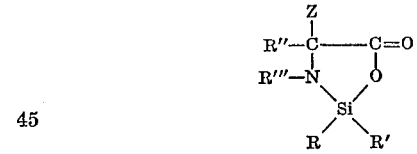

where R and R' are monovalent hydrocarbon radicals, R'' and Z are hydrogen or monovalent hydrocarbon radicals and R''' is monovalent aryl or substituted aryl group, R, R', R'', R''' and Z being free of active hydrogen as determined by the Zerewitinoff method which comprises forming an admixture of an aminoacid of the formula

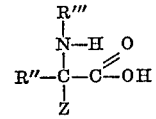

where R'', Z and R''' have the above-defined meanings and organosilicon compound of the formula

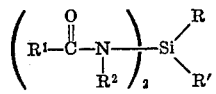

wherein R$^1$ and R$^2$ are monovalent hydrocarbon groups free of active hydrogen as determined by the Zerewitinoff method, and maintaining said admixture at a temperature at which said aminoacid and said organosilicon compound react to produce said organosilane.

12. A method as claimed in claim 11 wherein R'' is a monovalent hydrocarbon group, Z is hydrogen and R''' is a phenyl group; said aminoacid is optically active and said organosilane produced is optically active.

13. A composition as claimed in claim 2 which is optically active.

14. A composition as claimed in claim 5 which is optically active.

15. A process for the production of sila-oxazolidones of the formula

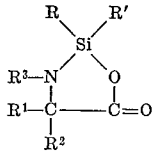

wherein R and R' are selected from the group consisting of monovalent hydrocarbon radicals, halogenated monovalent hydrocarbon radicals and cyanoalkyl groups and $R^1$ and $R^2$ are members of the group consisting of hydrogen, monovalent hydrocarbon radicals and halogenated monovalent hydrocarbon radicals and $R^3$ is a monovalent hydrocarbon radical which comprises forming an admixture of an α-aminoacid having the formula

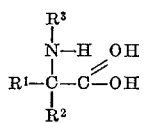

wherein $R^1$, $R^2$ and $R^3$ are defined as above, with a tertiary amine hydrogen halide acid acceptor and adding to said mixture a dihydrocarbondihalosilane of the formula

wherein R and R' are as above defined and X is halogen, maintaining said admixture at a temperature at which said chlorosilane and said aminoacid react to produce said sila-oxazolidone.

References Cited

UNITED STATES PATENTS 3,024,262   3/1962   Sommer _____ 260—448.8 X

TOBIAS E. LEVOW, *Primary Examiner.*

P. F. SHAVER, *Assistant Examiner.*

U.S. Cl. X.R.

260—448.8, 46.5